United States Patent [19]

Escamilla

[11] Patent Number: 4,769,252
[45] Date of Patent: Sep. 6, 1988

[54] METHOD FOR FORMING AND BAKING FLAT THIN DISCS OF DOUGH

[75] Inventor: Robert M. Escamilla, San Antonio, Tex.

[73] Assignee: Bakery Equipment & Service Co., Inc., San Antonio, Tex.

[21] Appl. No.: 103,291

[22] Filed: Oct. 1, 1987

Related U.S. Application Data

[62] Division of Ser. No. 826,245, Feb. 5, 1986, Pat. No. 4,724,755.

[51] Int. Cl.⁴ .............................................. A21D 6/00
[52] U.S. Cl. .................................. 426/496; 426/502; 426/512; 426/523
[58] Field of Search ............... 426/496, 497, 512, 513, 426/502, 517, 523; 99/349, 353, 395, 423, 443 C, 448; 100/156, 210; 425/397, 406

[56] References Cited

U.S. PATENT DOCUMENTS 4,281,025  7/1981  Longenecker ...................... 426/496
4,569,851  2/1986  Schultz ............................... 426/496

Primary Examiner—George Yeung
Attorney, Agent, or Firm—Hubbard, Thurman, Turner & Tucker

[57] ABSTRACT

A combination pressing and baking mechanism is provided for converting balls of dough into thin, flat discs, such as tortillas. The pressing unit comprises a pair of relatively pivotally movable heated pressing plates. The lowermost pressing plate is disposed at a substantial angle to the horizontal when it is in its remote position relative to the upper pressing plate. The angle of the lower pressing plate is selected to effect the gravitationally induced sliding of the pressed disc of dough off the lower pressing plate and onto a horizontally movable heating plate or disc of an oven. The horizontal velocity of the oven disc is maintained at a level equal to or greater than the horizontal component of velocity of the gravitationally discharged dough disc so as to facilitate removal of the dough disc from the lower pressing plate.

7 Claims, 3 Drawing Sheets

METHOD FOR FORMING AND BAKING FLAT THIN DISCS OF DOUGH

This application is a division of co-pending application Ser. No. 826,245, filed Feb. 5, 1986, now U.S. Pat. No. 4,724,755.

BACKGROUND OF THE INVENTION

1. Field of the Invention

This invention relates to a method and apparatus for producing thin discs of dough which can be subsequently baked to form tortillas, pizza shells, or the like, and particularly to a method and apparatus for pressing such thin, flat discs from a ball or patty of dough.

2. History of the Prior Art

Baked products in the form of flat discs of dough have long been utilized for the manufacture of tortillas, pizza pie shells, pita bread, or the like. Particularly in the case of tortillas, which are fabricated from a flour mix, it has been the common practice to fabricate the flour mix in the form of balls of dough and then insert each ball of dough between a lower pressing plate and a vertically spaced upper plate, and then bring the two pressing plates into juxtaposition to squeeze the ball of dough into the desired thin disc shape. On the other hand, pizza-pie shells are commonly formed by feeding a ball or patty of dough between the nip of two smooth-surfaced rollers which act on the dough to reduce it to the desired thickness.

The mechanization of the dough disc-forming operation is obviously desirable and there are numerous examples in the prior art of attempts to achieve such mechanization. See for example, U.S. Pat. Nos. 3,397,655 to VALADEZ et al, 3,223,053 to JIMENEZ et al, 4,241,648 to LONGENECKER, and 4,508,025 to SCHULTZ. None of these prior art apparatus have been completely satisfactory from the standpoint of uniform thickness of the resulting dough disc, ease of removal of the pressed disc, and ease of cleaning dough deposits from the pressing plates which inherently adhere to the discs, which are normally heated during the pressing operation.

SUMMARY OF THE INVENTION

This invention contemplates the formation of a thin disc of dough from a ball or patty of dough through the cooperation of two heated pressing plates which are relatively movable in a generally vertical plane. Preferably, the two plates are pivotally interconnected and movable from a remote position, in which a ball or patty of dough may be inserted between the plates, to a pressing position wherein the plates are disposed in closely spaced, juxtaposed relationship. Preferably the dwell time of the plates in the pressing position is adjustable to control the ultimate thickness of the formed dough disc. In the remote position, the lowermost plate is disposed at a substantial angle to the horizontal such that, when relative movement of the plates to the remote position is initiated after the pressing operation, the heated disc of dough on the lower plate will slide off such lower plate due to gravitational forces acting on the disc.

To further facilitate the removal of the pressed disc from the lower pressing plate, the lowermost discharge edge of the lower pressing plate is disposed in overlying relationship to a heated conveyor plate or disc which continuously moves in a substantially horizontal plane into the interior of an oven maintained at a temperature sufficient to effect the baking of the flour disc. The angle of inclination of the lower plate is correlated with the horizontal speed of movement of the conveying disc so that the conveying disc is always operating at a speed at least equal to the horizontal component of velocity of the gravitationally discharged dough disc. This insures that the moving conveyor plate will assist in removing the dough disc from the lower pressing plate and that the dough disc, which at this point is in a very fragile condition, will not be crumpled upon itself itself due to the fact that its horizontal velocity component exceeds that of the conveying plate.

In the preferred embodiment of the invention, the conveying plate preferably comprises the uppermost rotating disc of a rotating disc oven of the type described in U.S. Pat. No. 4,508,025 to SCHULTZ. In this apparatus, each of a plurality of vertically spaced, rotating discs mounted in the oven enclosure are separately heated, and the tortilla disc is sequentially removed and turned over as it is transferred from the uppermost disc successively to each of the lower discs. After it completes a rotation on the lowest disc, the tortilla is fully baked and is discharged into a removal conveyor for storage or packaging.

Further advantages of the invention will be readily apparent to those skilled in the art from the following detailed description, taken in conjunction with the annexed sheets of drawings on which is shown two preferred modifications of the invention.

DESCRIPTION OF PREFERRED EMBODIMENTS

Figure 1:
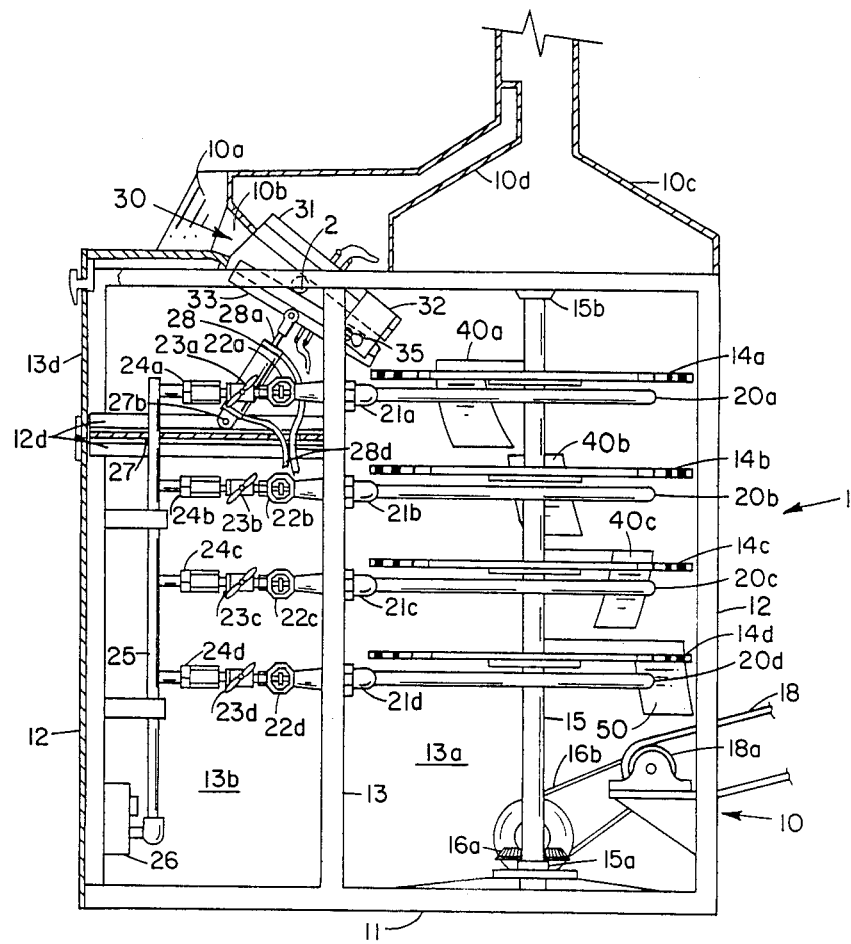
FIG. 1 is a schematic, vertical sectional view of a pressing apparatus embodying this invention shown in assembled relationship to a rotating disc-type oven, and with the pressing plates open to receive a ball of dough.

Referring to FIGS. 1, 2A, 2B, and 3 of the drawings, combined press and baking unit for producing flat disc dough products from balls, pattys, or lumps of premixed dough, is designated by the numeral 1 and comprises a frame structure 10 defining a generally rectangular cubicle enclosure. Frame structure 10 is shown as comprising a solid bottom wall 11, exterior walls 12, which may be of sheet metal or glass, and a vertical partitioning wall 13. While the bottom wall 11 and the partition wall 13 are shown as solid elements for convenience of illustration, those skilled in the art will recognize that these wall members may be formed by welding of sheet metal to articulated welded frames formed from angle iron. For example, the frame construction illustrated in the abovementioned U.S. Pat. No. 4,508,025 could be utilized in constructing the frame 10.

Space 13a to the right of the vertical partition wall 13 is utilized as an oven within which a plurality of vertically spaced heating discs 14a, 14b, 14c, and 14d are mounted in vertically stacked relationship on a vertical drive shaft 15. Drive shaft 15 is journalled in bearings 15a and 15b, and is rotated by a drive motor 16 through bevel gears 16a. Additionally, drive motor 16 is connected by a chain drive 16b to a driving roller 18a for an oven discharge conveyor 18 which extends out of the lower end of the right-hand side of frame structure 10. Again, further details of this driving mechanism may be found in the aforementioned U.S. Pat. No. 4,508,025.

Each of the oven plates 14a, 14b, 14c, and 14d are respectively heated by annular gas pipe burners 20a, 20b, 20c, and 20d. The burners 20a-20d are respectively supplied with a combustible mixture of air and gas through fittings 21a, 21b, 21c, and 21d, air injection valves 22a, 22b, 22c, and 22d, and manually operated adjustable valves 23a, 23b, 23c, and 23d. The manual valves are in turn respectively connected through suitable fittings 24a, 24b, 24c, and 24d to a common manifold pipe 25 which connects to a conventional, dual gas control valve 26. Further details of the heating arrangements for the oven compartment 13a may be found in the aforementioned U.S. Pat. No. 4,508,025. The specific mechanism for heating the rotating oven plates 14a, 14b, 14c, and 14d forms no part of the instant invention.

The upper left-hand sidewall of left-hand chamber 13b is provided with an access opening which is normally closed by a pivoted door 13d. A pair of horizontal slide guides 12d are conventionally secured to frame 10 at the level of the bottom of door 13b. A support plate 27 is slidably insertable in guides 13d and secured therein by closing of door 12b. Support plate 27 provides a pivotal mounting 27b for a conventional variable stroke, fluid pressure cylinder 28 which may be actuated by pressured air or oil supplied by hoses 28d.

Pressing mechanism 30 comprises an upper pressing plate 31 which is preferably rigidly mounted by conventional means in the frame structure 10 in generally triangular relationship across the top end of the chamber 13b. Thus, upper pressing plate 31 is disposed in an angular relationship to the horizontal. On the lowermost end of upper pressing plate 31, a pair of depending brackets 32 are rigidly secured. A lower pressing plate 33 is pivotally secured adjacent the one edge thereof to brackets 32 by an eccentric pivot pin unit 35 which is shown in detail in FIG. 5 and will be later described.

Figure 2A:
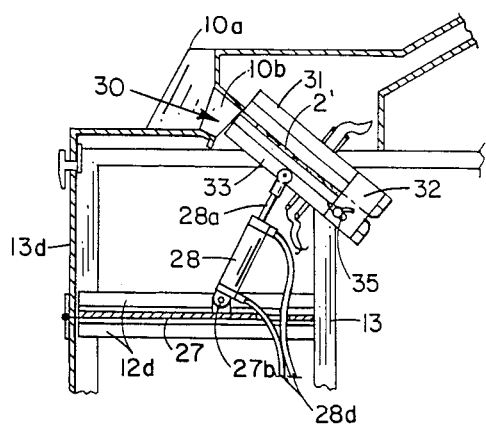
FIG. 2A comprises a portion of FIG. 1, but showing the pressing plates in their dough-pressing position.

The piston rod element 28a of the variable stroke cylinder unit 28 is pivotally secured to a medial portion of the underside of lower pressing plate 33 so that extension movement of the cylinder 28 produces a pivoting of the lower pressing plate 33 from the remote position shown in FIG. 1 relative to the upper pressing plate 31 to a closely spaced, juxtaposed position illustrated in FIG. 2A. In such remote position of the pressing plates 31 and 33, the separation between the upper edges of such plates is sufficiently large to permit a ball or patty of dough 2 to be trapped therebetween. For this purpose, suitable sheet metal elements 10a are mounted on the frame 10 to define a trough-shaped, downwardly inclined opening 10b through which the dough ball or patty 2 may be inserted. Preferably, the spacing of the pressing plates 31 and 33 in such remote position is adjusted by the stroke of cylinder 28 so that the ball or patty 2 will be trapped by such plates at a position representing approximately the center of the pressing plates.

When the pressing plates 31 and 33 are brought into their juxtaposed position by operation of the variable stroke cylinder 28, as shown in FIG. 2A, the ball or patty 2 will be reformed into a flat disc-like configuration 2', representing the final form of the bakery product prior to baking such. The thickness of dough disc 2' is determined by adjustment of the eccentric pivot pin unit 35 and the stroke of cylinder 28, and also by control of the length of time that the plates are held in the pressing position, the longer the time, the thinner the dough disc becomes.

Figure 5:
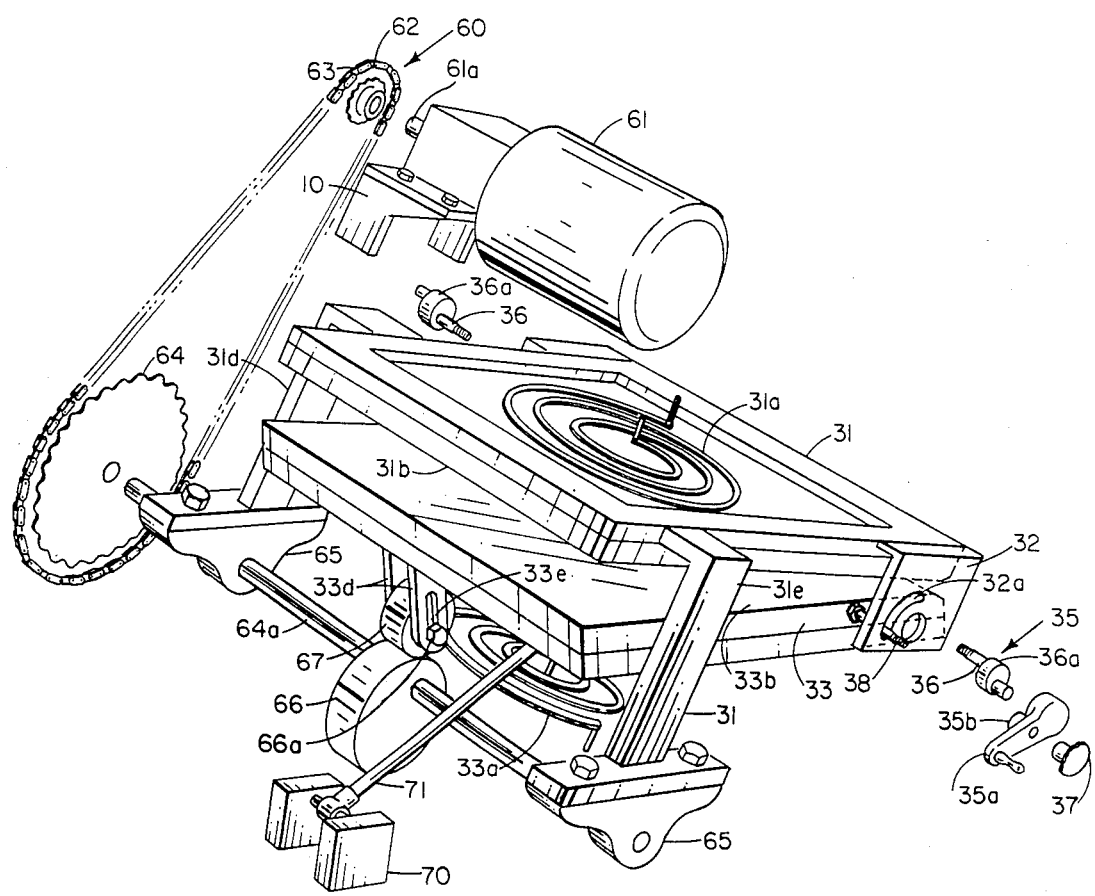
FIG. 5 is an enlarged scale, exploded perspective view of the pressing plate mechanism incorporated in the modification of FIG. 4.

As best shown in FIG. 5, the pressing plates 31 and 33 have their non-juxtaposed sides recessed to respectively receive electrical heating coils 31a and 33a so that the pressing surfaces of pressing plates 31 and 33 will be maintained at a temperature on the order of 400° F. in order to impart a crust to the disc 2' formed by the pressing operation, which facilitates its ability to slide relative to the lower-pressing plate 33.

At the conclusion of the pressing operation, which is controlled by any conventional timer, the pressured fluid supplied to the adjustable stroke cylinder 28 is reversed so as to retract the piston rod 28a within the cylinder and move the pressing plates toward their remote position. This inherently means that the pressed disc 2' will move with the lower pressing plate 33 and as soon as the pressed disc 2' is free from the upper plate, it will tend to slide downwardly off the lower pressing plate 33 which is still disposed at a substantial angle to the horizontal. The exact angle selected for the discharge position of the lower pressing plate 33 obviously has to be sufficiently large to insure that the pressed dough disc 2' will readily slide off the lower pressing plate 33. At the same time, the angle must be selected so that the horizontal component velocity of the sliding pressed disc 2' does not exceed the horizontal rotational speed of the upper baking disc 14a.

Thus, in the preferred embodiment of the invention, the speed of the upper baking disc 14a will always be equal or slightly greater than the horizontal component of the velocity of the downwardly sliding pressed disc 2'. Thus, the baking plate 14a actually assists in removing the pressed disc 2 from the lower pressing plate 33. If the horizontal component of velocity of the pressed disc 2 exceeds the horizontal speed of the baking plate 14a, the very fragile dough disc 2' will tend to pile up or form ridges as its bottommost edge strikes the slower moving surface of the uppermost baking plate 14a.

Figure 2B:
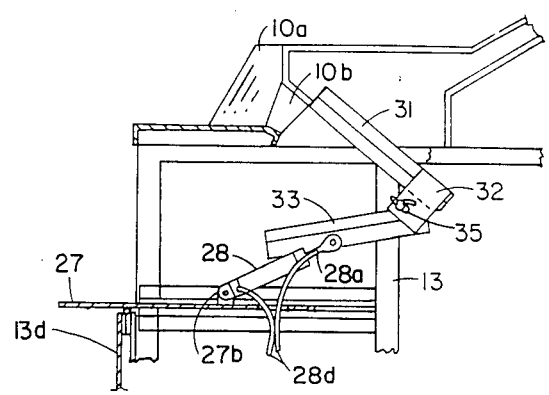
FIG. 2B comprises a portion of FIG. 1, but illustratng the exposure of the pressing plates for cleaning.
Figure 3:
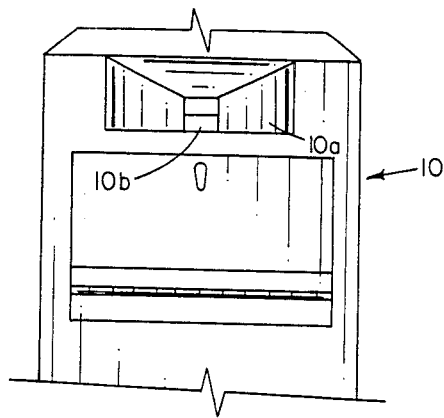
FIG. 3 is a partial, side elevational view of the apparatus of FIG. 1.

As shown in FIG. 2B, the specific mounting of the adjustable stroke cylinder 28 on the support plate 27 permits convenient access to the pressing plates 31 and 33 for cleaning purposes. Merely by opening the door 13d, the support plate 27 may be slid horizontally out of the frame structure 10 as shown in FIG. 2B and, thus, expose the entire pressing surfaces of both the lower pressing plate 33 and the upper plate 31 for convenient cleaning.

Since, as mentioned above, it is preferred that the pressing surfaces 31b and 33b be heated, a venting structure is built into the frame 10 for venting any gases released by the dough during the pressing operation. Such vent structure is represented by the inclined chimney 10d which joins with the chimney 10c which is commonly provided at the top of the oven compartment 13a.

Through the utilization of a variable stroke cylinder 28, it will be apparent that the final angular position of the lower pressing plate 33 can be primarily determined by adjustment of the contraction stroke of the cylinder 28. The adjustable eccentric pivot pin unit 35 is provided to insure that the separation of the lower edges of pressing plates 31 and 33 exceeds the thickness of the pressed dough disc 2' as the lower plate 33 is pivoted to said remote position. Thus, the angle selected for the remote position of pressing plate 33 is sufficient to induce gravitational discharge movement of the pressed disc 6 at a speed wherein the horizontal component of such velocity does not exceed the horizontal speed of the rotating baking disc 14a.

Intermediate each of the rotating baking discs or plates 14a and 14b, 14b and 14c, and 14c and 14d, deflector and transfer mechanisms 40 are provided which are constructed to remove the dough disc 2' from the particular rotating plate and transfer it in an inverted position to the next successive lower plate. The details of this mechanism are fully described and illustrated in the aforementioned U.S. Pat. No. 4,508,025, hence further description thereof is deemed to be unnecessary. Adjacent the lowermost baking plate 14d, a deflector 50 is provided for removing the now fully baked dough disc 2' from the bottom rotating plate 14d and transferring it to the removal conveyor 18. Thus, the pressed dough disc 2' is carried through the oven area 13a with its opposite sides successively exposed to the heated rotating plates 14a–14d, insuring uniform baking of both sides of the dough disc 2' and producing a superior final product.

Figure 4:
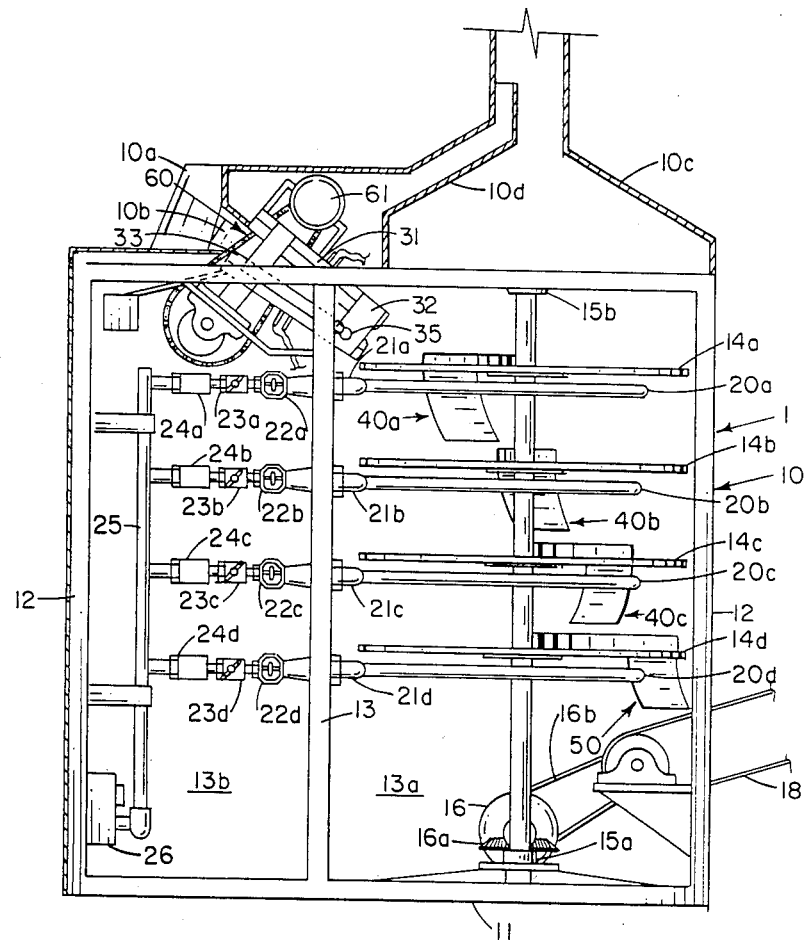
FIG. 4 is a schematic, vertical sectional view of a modification of this invention employing mechanical means for effecting the cyclic operation of the pressing plates.

Referring now to FIGS. 4 and 5, there is shown an alternative embodiment of this invention wherein a mechanical drive is employed to actuate the heated pressing plates 31 and 33. All other elements of the combined pressing and baking apparatus remain unchanged and are identified by the same numerals as employed in the description of FIGS. 1 through 3.

In the modification of FIG. 4, the support plate 27 and cylinder 28 are eliminated from the left-hand chamber 13a and in their place, a mechanical driving mechanism 60 is conventionally mounted. As best shown in FIG. 5, such mechanical driving mechanism comprises an electric motor 61 having an output shaft 61a driving a pinion 62. Pinion 62 drives a chain 63 which in turn drives a larger pinion 64. Pinion 64 drives a horizontal shaft 64a which is suspended in suitable bearing brackets 65 conventionally mounted on two depending brackets 31d and 31e, respectively, rigidly secured in depending relationship to the upper pressing plate 31.

As best shown in FIGS. 4 and 5, the upper pressing plate 31 is conventionally mounted in the top portions of the left-hand chamber 12b. Depending brackets 32 are provided on each side of upper pressing plate 31 to pivotally mount the lower pressing plate 33 thereto by an ajustable eccentric pivot pin unit 35. A pair of coaxially aligned stub shafts 36 are conventionally secured to opposite sides of lower pressing plate 33 adjacent its lowermost end. An adjusting handle 35a is secured to at least one stub shaft 36. Stub shafts 36 are respectively eccentrically pivotally mounted in the brackets 32 by an eccentric cylinder portion 36a provided on each of the ends of stub shafts 36. Thus, angular movement of the handle 35a of the eccentric pivot unit 35 will effect a vertical displacement of the lower edge of the lower pressing plate 33 with respect to the lower edge of the upper pressing plate 31. The eccentric pivot pin unit 35 may be locked in any selected adjustment position by a hand knob 37 which may be tightened on the threaded end of a bolt 38 projecting from the inside of bracket 32, which traverses a bushing 35b provided on the handle 35a and an arcuate slot 32a provided in the bracket 32.

The pivotal movement of the lower pressing plate 33 relative to the fixed upper pressing plate 31 is accomplished in this modification by a rotary cam 66 which is secured to the central portion of the transverse shaft 64a. A rotatable cam follower 67 is disposed between two depending brackets 33d provided on the under side of the lower pressing plate 33. Cam follower 67 is adjustably positioned within elongated slots 33e provided in brackets 33b by a clamping bolt 66a. Thus, the position of lower pressing plate 35 relative to the upper plate 31 may be conveniently adjusted.

From the foregoing description, it is apparent that lower pressing plate 33 will be periodically elevated into a desired pressing position with respect to the upper pressing plate 31. The contour of cam 66 determines the dwell time, or how long the pressing plate 33 remains in the pressing position. To assure the prompt movement of the pressing plate 33 downwardly from the pressing position, a counter weight 70 may be mounted on the end of a rod 71 which is suitably secured to the bottom surface of the lower pressing plate 33.

In both modifications of this invention, the positions of the pressing plates 31 and 33 are adjusted to conform to the particular size of dough balls or pattys that are to be inserted between such plates, and the desired thickness of the resulting pressed dough disc 2'. Preferably, in the remote or open position of the pressing plates 31 and 33, the spacing is such that the dough ball or patty 2 will be caught between the medial portions of the heated pressing plates 31 and 33. The lower ends of pressing plates 31 and 33 are always adjusted to a separation in the remote position of the pressing plates that is in excess of the thickness of the resulting pressed dough disc 2', thus permitting the dough disc 2' to freely slide by gravitational forces off the lower pressing plate 33.

Although the invention has been described in terms of specified embodiments which are set forth in detail, it should be understood that this is by illustraticn only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of pressing a thin flat disc of dough from a ball of dough comprising the steps of:
    (1) mounting two pressing plates to move relatively vertically from a widely spaced first position to a closely spaced, juxtaposed second position;
    (2) inserting a ball of dough between said plates in said first position and pressing same to the desired disc shape by moving said plates to said closely spaced, juxtaposed second position; and
    (3) positioning the lower one of said pressing plates at the conclusion of the pressing operation at a selected angle relative to the horizontal, said angle being selected to produce a gravitational sliding movement of the pressed disc of dough downwardly off the lower one of said pressing plates as said plates are relatively moved to said first position.

2. The method of claim 1 wherein said pressing plates are relatively pivoted about a horizontal axis between said first and second positions.

3. The method of claim 1 further comprising the step of heating the pressing plates to a temperature sufficient to form a crust on the surfaces of the pressed dough disc.

4. The method of claim 1 further comprising the step of heating the pressing plates to a temperature on the order of 400° F.

5. The method of claim 1 further comprising the step of increasing the vertical spacing of the upper one of said pressing plates at the conclusion of the pressing operation relative to the lower one of said pressing plates to provide a clearance between the lowermost edges of said plates greater than the thickness of the pressed disc of dough.

6. The method of claim 1 further comprising the step of moving a conveyor below the lower one of said pressing plates to receive the sliding disc of dough from the lower one of said pressing plates.

7. The method of claim 6 further comprising the step of moving the conveyor at substantially the same horizontal speed as the sliding disc of dough.

* * * * *